UNITED STATES PATENT OFFICE.

MARSTON LOVELL HAMLIN, OF BLOOMFIELD, NEW JERSEY, ASSIGNOR TO AMERICAN SYNTHETIC DYES INCORPORATED, A CORPORATION OF VIRGINIA.

RECOVERING BENZENE MONOSULFONIC ACID AND PRODUCING PHENOL.

1,309,683.   Specification of Letters Patent.   Patented July 15, 1919.

No Drawing.   Application filed August 25, 1916.   Serial No. 116,781.

*To all whom it may concern:*

Be it known that I, MARSTON LOVELL HAMLIN, a citizen of the United States, and a resident of Bloomfield, New Jersey, have invented certain new and useful Improvements in Recovering Benzene Monosulfonic Acid and Producing Phenol, of which the following is a specification.

It is often desirable to recover benzene monosulfonic acid from mother liquids strongly acid with sulfuric, hydrochloric or other acids. Among other ways this has been done by precipitating the magnesium salt of the benzene monosulfonic acid by adding a sufficient amount of strong magnesium chlorid solution to the liquor from which the recovery is to be made.

I have discovered a new way of making this recovery which has the advantage of using a cheaper material and one which is less bulky per effective unit, namely, magnesium carbonate (from which in fact magnesium chlorid is commonly manufactured).

In carrying out my process, the magnesium carbonate, most conveniently obtainable as magnesite, is finely ground and a sufficient amount, previously experimentally determined, is added to the acid liquor, from which the recovery is to be made. On account of the acidity of this liquor, the magnesium carbonate readily dissolves; solution may be hastened by heating the liquid. When the solution is complete and the liquid has been allowed to cool, magnesium benzene monosulfonate, if the corresponding acid was present in sufficient concentration, separates as an easily filtrable, granular precipitate. To get the maximum percipitation the liquid should be cooled.

In practice I have found that it should be cooled to a temperature between zero and twenty degrees centigrade, with best results at about ten degrees.

The invention is particularly useful in the production of synthetic phenol. The benzene monosulfonic acid and its alkali salts recovered by this method may also be used in preparing benzene sulfone chlorid ($C_6H_5SO_2Cl$) by treatment with phosphorus pentachlorid ($PCl_5$); or in preparing benzo nitrile ($C_6H_5CN$), and hence benzoic acid, by treatment with potassium cyanid (KCN); or may be used for various other purposes. And the mother liquor from which the benzene monosulfonic acid is obtained may be that which occurs in other processes than the manufacture of phenol.

Taking one of the usual synthetic phenol processes as an example, there are four principal reactions.

First. Sulfonation of benzol to benzene monosulfonic acid, thus;—

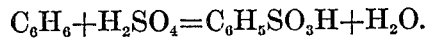
$$C_6H_6 + H_2SO_4 = C_6H_5SO_3H + H_2O.$$

Second. Conversion of benzene monosulfonic acid to its sodium salt by reacting on it with a strong brine (NaCl solution). The reaction is

$$C_6H_5SO_3H + NaCl = C_6H_5SO_3Na + HCl.$$

Since the reaction here is not complete and the sodium benzene monosulfonate is not completely insoluble, part of the benzene monosulfonic acid remains in the solution either as such or in the form of its soduim salt in the mother liquor from which the insoluble salt has been recovered.

Third. Fusing this sodium salt when dried with caustic soda to produce sodium phenolate, thus;—

$$C_6H_5SO_3Na + 2(NaOH) = C_6H_5ONa + Na_2SO_3 + H_2O.$$

Fourth. Decomposing the resulting sodium phenolate with an acid to liberate the phenol, thus;—

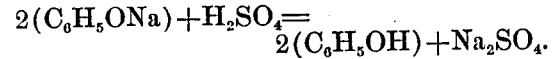
$$2(C_6H_5ONa) + H_2SO_4 = 2(C_6H_5OH) + Na_2SO_4.$$

The economical recovery of the benzene monosulfonic acid or its salts from the mother liquor described under "second", above is what is made possible by my invention. This is done by the addition of magnesium carbonate to the said mother liquor, the recovery being in the form of a magnesium salt of the acid; and such magnesium salt is added directly to the sodium salt in the third step of the process outlined above and fused with the caustic soda, increasing the yield of phenolate and the ultimate yield of phenol.

In adding the magnesium carbonate to the mother liquor, the factors which give maximum precipitation of magnesium benzene sulfonate are somewhat complex even at a given temperature, but the following rules will permit a determination close enough for practical purposes.

First, enough acid must be present to dissolve the carbonate, and a not too large excess helps the subsequent precipitation.

Second, enough magnesium must be present to be equivalent to the benzene monosulfonic acid or its salts present, and an excess causes a more nearly complete precipitation.

For example, 30 grams of powdered magnesite were dissolved in 500 grams of a sample of mother liquor as previously described, the solution cooled and centrifuged, giving a net yield of magnesium benzene sulfonate of 31.7 grams. When an equal amount of mother liquor was treated in the same way with 20 grams of magnesite, the yield was 25.1 grams. As the amount of magnesium carbonate to be made would vary in different instances depending upon the acidity and concentration of the benzene monosulfonic acid or its salts present, several tests of the above sort would determine the minimum amount to be added to obtain maximum precipitation from any given mother liquor.

What I claim is:—

In the manufacture of synthetic phenol, the process which consists in converting benzene monosulfonic acid into a sodium salt thereof, part of which is insoluble and precipitates out, and part of which remains after the removal of the precipitation dissolved in the mother liquor; treating said mother liquor with magnesium carbonate and separating and recovering the magnesium salt of said acid, and fusing said sodium and magnesium salts together with caustic soda.

In witness whereof I have hereunto signed my name.

MARSTON LOVELL HAMLIN.